United States Patent [19]

Arends et al.

[11] 4,377,377
[45] * Mar. 22, 1983

[54] DIFFERENTIAL PRESSURE FORMING MACHINE WITH VARIABLE MOLD CLOSED CYCLE

[75] Inventors: Albert W. Arends, Gladwin; George L. Pickard, Beaverton; George A. West, Clare; Edward J. Russell, Gladwin, all of Mich.

[73] Assignee: Leesona Corporation, Warwick, R.I.

[ * ] Notice: The portion of the term of this patent subsequent to Jun. 19, 1996, has been disclaimed.

[21] Appl. No.: 216,317

[22] Filed: Dec. 15, 1980

Related U.S. Application Data

[63] Continuation of Ser. No. 117,458, Feb. 1, 1980, abandoned, which is a continuation of Ser. No. 38,384, May 14, 1979, abandoned, which is a continuation-in-part of Ser. No. 904,587, May 10, 1978, Pat. No. 4,158,539.

[51] Int. Cl.³ .............................................. B29C 17/00
[52] U.S. Cl. ................................... 425/155; 264/322; 425/394; 425/451.2; 425/451.4
[58] Field of Search ................... 425/451.4, 155, 451.2, 425/394; 264/322

[56] References Cited

U.S. PATENT DOCUMENTS

| | | | |
|---|---|---|---|
| 3,816,052 | 6/1974 | Schopper et al. | 425/398 X |
| 3,837,782 | 9/1974 | Meissner et al. | 425/382.1 X |
| 3,876,361 | 4/1975 | Erwin | 425/388 X |
| 4,158,539 | 6/1979 | Arends et al. | 425/398 X |

FOREIGN PATENT DOCUMENTS 25287 of 1914 United Kingdom ................ 425/423

*Primary Examiner*—Philip E. Anderson
*Attorney, Agent, or Firm*—Learman & McCulloch

[57] ABSTRACT

A thermoforming machine having opposed mold platens includes a linkage system driven in cyclic movement by rotary cam mechanism to cyclically shift the platens between their open and closed position. The cam mechanism is driven by a variable speed motor which is controlled in a manner such that the rotary speed of the cam mechanism during different portions of a cam revolution may be set to a speed which is different than the rotary speed of the cam mechanism during other portions of each revolution. By adjusting the speed differential or by adjusting the angular extent of that portion of a revolution of the cam mechanism over which the different speed is maintained the time duration of any chosen portion of the cycle may be adjusted independently of the time duration of other portions of the cycle.

30 Claims, 10 Drawing Figures

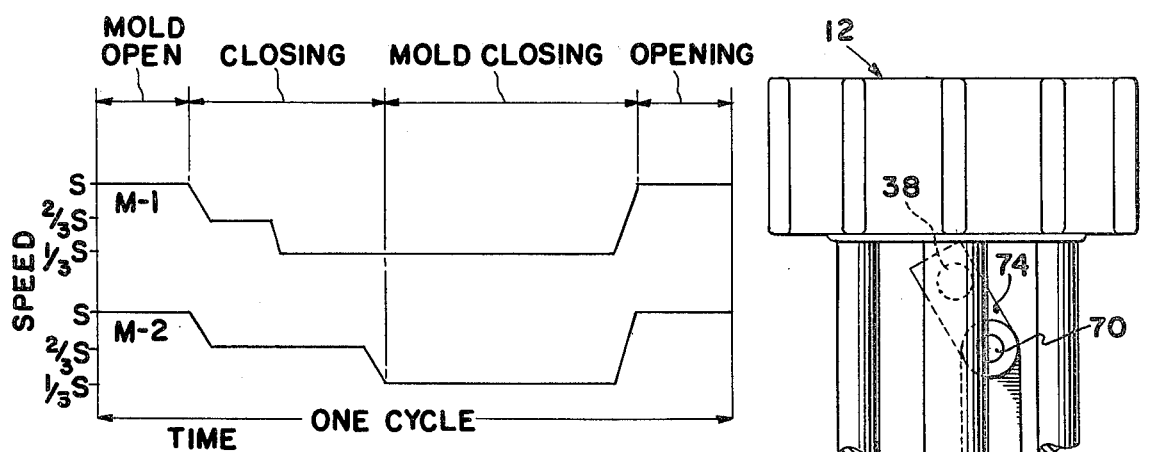
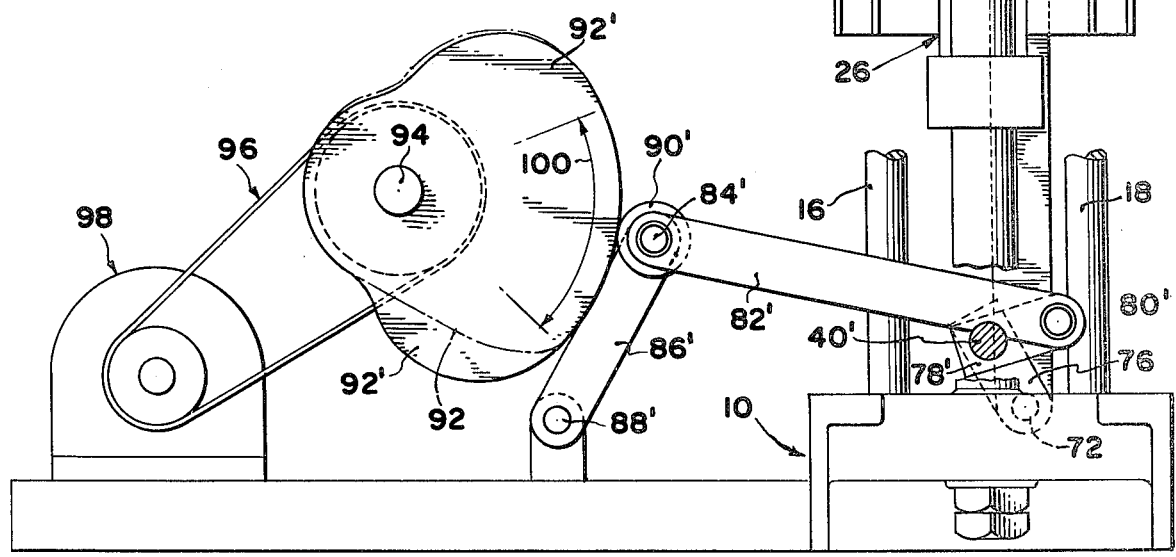
FIG.8
FIG.7

DIFFERENTIAL PRESSURE FORMING MACHINE WITH VARIABLE MOLD CLOSED CYCLE

This is a continuation of application Ser. No. 117,458, filed Feb. 1, 1980, now abandoned; which is a continuation of Application Ser. No. 38,384, filed May 14, 1979, now abandoned; which is a continuation-in-part of Ser. No. 904,587, filed May 10, 1978, which matured into U.S. Pat. No. 4,158,539 on June 19, 1979.

BACKGROUND OF THE INVENTION

The present invention is especially directed to thermoforming machines of the type in which a pair of mold carrying platens are cyclically driven in movement between open and closed positions to theremoform parts on a mass production basis. The characteristics of the articles or of the thermoplastic material from which the articles are being formed can vary, and some materials require a greater length of time in the forming stage than do others. Because these machines are designed for cyclic operation, it is usually difficult and sometimes impossible to change the time duration of one stage of the cycle without proportionately affecting the time duration of other stages of the cycle. Thus, merely slowing down the main drive to extend the time period of the mold closing stage or the mold closed stage of the cycle is usually impractical. In some cases it has been proposed to stop the main drive for a given period of time at some point in the cycle, however, this concept has proved less than satisfactory in practice due to the difficulties in obtaining drive components, particularly clutches, which will stand up under the mechanical loads imposed by such arrangements.

The present invention is especially directed to a positive mechanical linkage type platen shifting arrangement which enables the time during which the mold platens are closing or are held in their closed position to be adjustably varied independently of each other and without any consequent variations of the time duration of other stages of the cycle and without imposing any undue loading on any components of the drive system.

SUMMARY OF THE INVENTION

In accordance with the present invention, upper and lower mold carrying platens are vertically reciprocated between their mold closed and mold open position by respective toggle assemblies which are actuated by upper and lower rock shafts rotatably mounted in the machine frame. In one embodiment of the invention, a connecting link extends between cranks carried by the respective rock shafts to that the platens move in unison and driving movement transmitted to the lower rock shaft is in turn transmitted by the connecting link to the upper rock shaft. The lower rock shaft is driven in oscillatory movement by a drive link pivotally connected to a drive crank on the lower rock shaft. The drive link is in turn oscillated by a rotary cam which is driven in rotation by a variable speed drive motor through a gear box, one revolution of the cam driving the mold carrying platens through one complete opening and closing cycle. The cam surface includes a dwell section of constant radius and fixed annular extent which, when engaged with the cam follower on the drive link holds the mold platens in their closed position for that period of time required by the cam to rotate through the angle over which the dwell section extends. The time so required for this angular increment of movement of the cam is the time during which the mold platens are held in their closed position. In another embodiment of the invention a separate cam is used to drive each mold platen.

Variation of the time over which the mold platens are closing or are held in their closed positions is accomplished in the present invention by varying the time required for a cam to completely rotate its mold closing or its mold closed dwell portion past its cam follower. The variable speed motor is set up to operate at different speed setting, one of the setting being at a so-called normal speed which drives a cam through all portions of its cycle other than the mold closing stage and the mold closed stage, and to drive at other slower speeds during these latter stages. A control system is set to shift the motor control between the various speed settings at selected shaft angles of the cam shaft so that a cam rotates at a slower than normal speed while its follower is traversing the mold closing area or the mold closed dwell sector of the cam surface. The desired timing may be varied in two ways—by suitable selection of a lower speed or by setting the control system to establish this lower speed over all or only a portion of the angular extend of the dwell sector of the cam or cams.

Other objects and features of the invention will become apparent by reference to the following specification and to the drawings.

IN THE DRAWINGS

FIG. 7 is a fragmentary, side elevational view, schematically illustrating a second embodiment of the invention in which the upper and lower mold carrying platens are operated by separate cams; and FIG. 8 is a view similar to FIG. 6a, illustrating a typical speed time cycle for the second embodiment of the invention.

Figure 2:
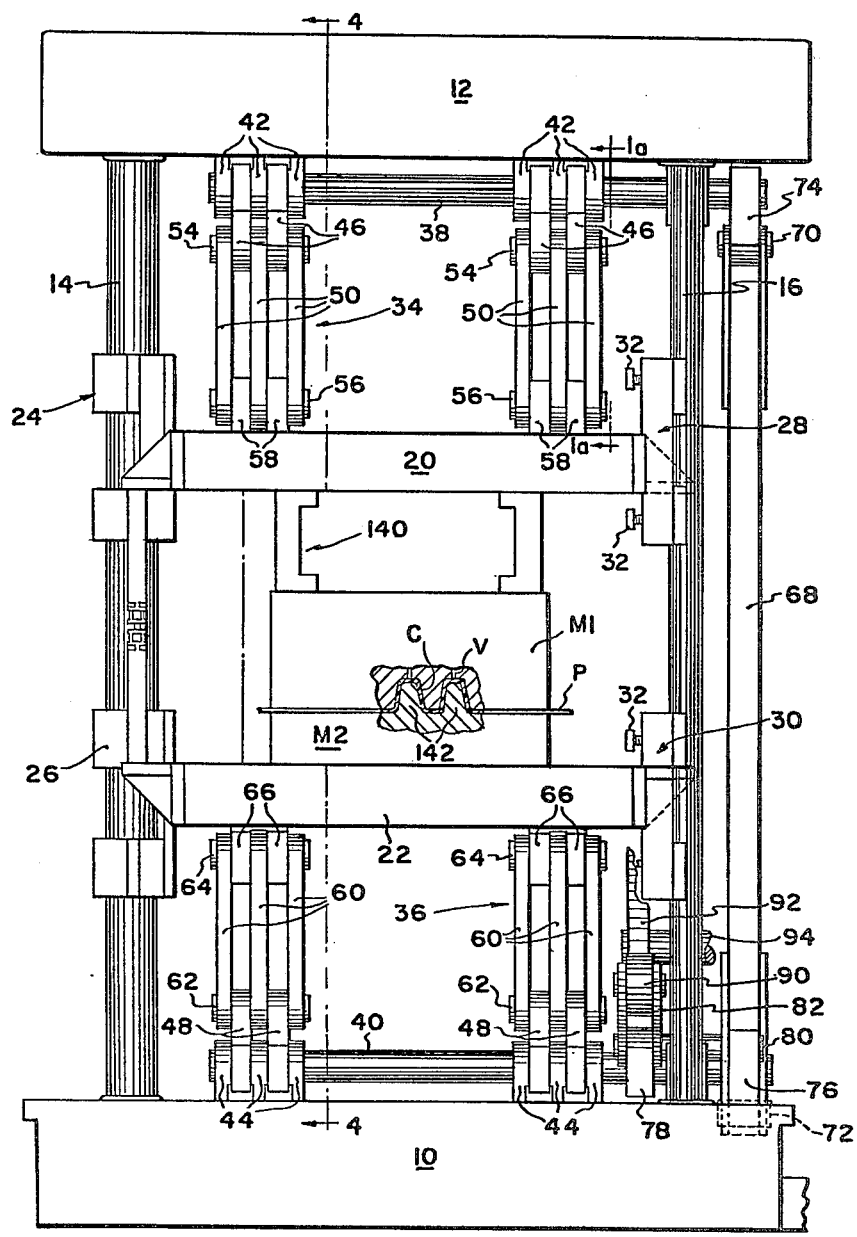
FIG. 2 is an end view of the apparatus of FIG. 1, with certain parts broken away or shown in section.
Figure 3:
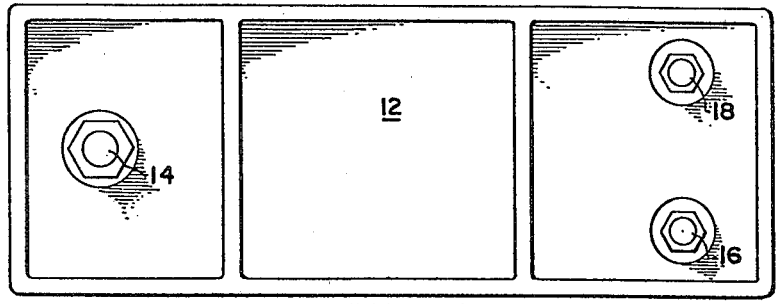
FIG. 3 is a partial top plan view of the apparatus of FIG. 1.

The overall arrangement of the machine is perhaps best shown in FIG. 2. The machine includes a stationary base designated generally 10 and an upper frame member designated generally 12 which is supported above base 10 by three fixed vertical columns or posts 14, 16 and 18. Referring briefly to FIG. 3, it is seen that the posts are arranged in generally triangular relationship with a relatively large diameter single post 14 at one end of the frame and a pair of spaced posts 16 and 18 of somewhat smaller diameter arranged at the opposite side of the frame.

Returning to FIG. 2, upper and lower mold carrying platens 20 and 22, respectively, are slidably supported on posts 14, 16 and 18 for guided vertical movement, platens 20 and 22 being slidably mounted upon post 14 by full bearing assemblies designated generally 24 and 26 and being slidably supported upon posts 16 and 18 by half-bearing assemblies designated generally 28 and 30. Half-bearing assemblies 28 and 30 are provided with adjustments 32 so that a precise seating of these assemblies on the posts can be achieved. Half-bearings of this type employed in thermoforming machines are disclosed in U.S. Pat. No. 3,677,675, to which reference may be had for further details of the bearing construction.

Figure 1A:
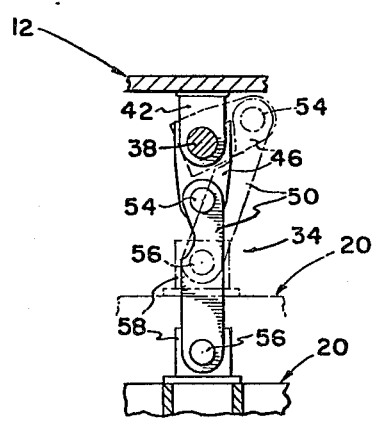
FIG. 1a is a detail cross sectional view, taken on the line 1—1 of FIG. 2 to show the manner of actuation of the toggle linkage.
Figure 4:
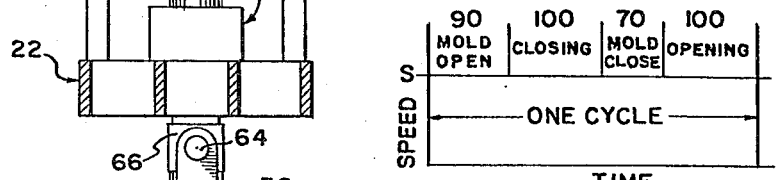
FIG. 4 is a cross sectional view, taken on the line 4—4 of FIG. 2.

Vertical positioning of upper and lower platens 20 and 22 upon the vertical posts is accomplished by upper and lower toggle link assemblies designated generally 34 and 36, respectively. The two toggle link assemblies 34 and 36 are of similar construction and operation and are best seen in FIGS. 1a, 2 and 4. Referring to FIG. 4, upper and lower rock shafts 38 and 40, respectively are rotatably supported on upper frame member 12 and base 10 by respective brackets 42 and 44. Upper toggle cranks 46 are fixedly secured to upper rock shaft 38 for rotation with shaft 38, while similar lower toggle cranks 48 are similarly mounted upon lower rock shaft 40. A series of upper toggle links 50 are pivotally supported on toggle cranks 46 as by pivot pins 54 and the opposite end of toggle links 50 are pivotally connected as by pivot pins 56 to bearing assemblies 58 fixedly mounted on upper platen 20. Corresponding lower toggle links 60 are pivotally connected to lower toggle cranks 48 as by pivot pin 62 and by pivot pins 64 to bearing blocks 66 fixedly mounted on lower platen 22. When the toggle assemblies are in their straight line or fully extended position as shown in FIG. 4, and in full line in FIG. 1a, the platens 20 and 22 are in their mold closed position.

To shift the platens to and from their mold open position, rock shafts 38 and 40 are driven in partial rotation, by mechanism to be described below, so that the upper toggle link assembly 34 assumes the broken line position shown in FIG. 1a. The lower toggle link assembly 36 is similarly driven to a position corresponding to that of the upper toggle link assembly in FIG. 1a. Coordination of the rotation of the upper and lower rock shafts 38 and 40 is accomplished by an elongate connecting link 68 (FIGS. 1 and 2) which is pivotally connected at its opposite ends as at 70 and 72 to upper and lower drive cranks 74 and 76, respectively, cranks 74 and 76 being fixedly secured to the respective upper and lower rock shafts 38 and 40.

Figure 1:
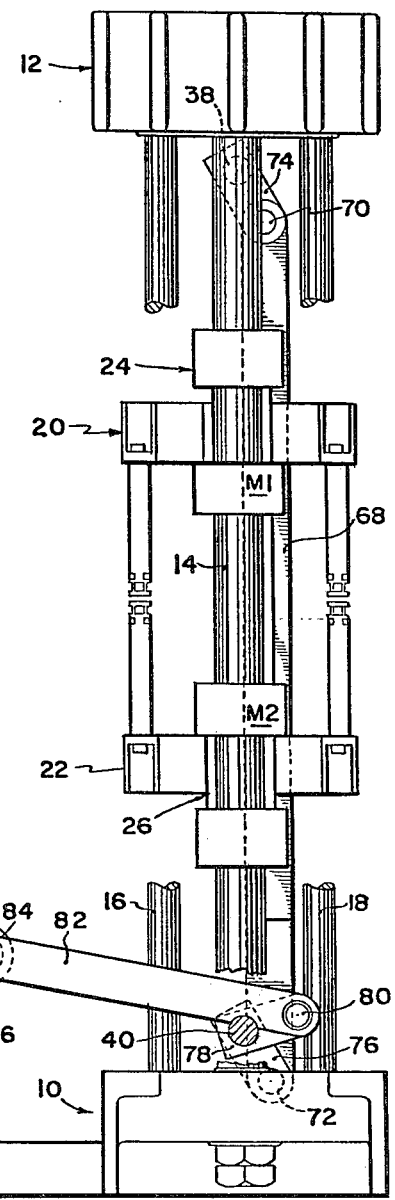
FIG. 1 is a side elevational view of an apparatus embodying the present invention, with certain parts broken away or omitted.
Figure 1:
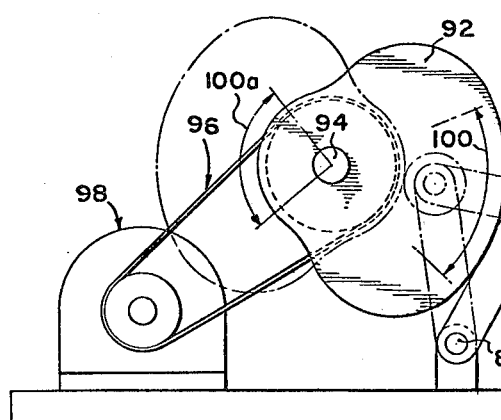

Rocking movement of rock shafts 38 and 40 is accomplished by mechanism best shown in FIGS. 1 and 2. Referring particularly to FIG. 1, a main drive crank 78 is fixedly mounted on lower rock shaft 40 and is pivotally connected by a pivot pin 80 to one end of a main drive link 82. The opposite end of main drive link 82 is coupled by a pivot pin 84 to a support link 86 whose opposite end is pivotally supported upon the machine base as at 88. A cam follower bearing 90 is rotatably supported on pivot pin 84 and engages the peripheral surface of a drive cam 92 fixedly mounted on a cam shaft 94 mounted for rotation about a fixed axis by suitable means, not shown, upon base 10. Cam shaft 94 is driven in rotation, via a belt and pulley connection designated generally 96, by a variable speed drive means designated generally 98 which will be described in greater detail below. The weight of platens 20 and 24 and the arrangement of the linkage previously described is such that cam follower 90 is gravitationally biased against the periphery of cam 92 at all times.

The surface of the cam is so configured as to drive the upper and lower rock shafts 38 and 40 in rotary oscillation to shift platens 20 and 22 between their open and closed positions and to maintain the platens in their open and closed positions for selected periods of time. The maintaining of the platens in a stationary open or closed position is accomplished by constant radius sections of the cam. Referring to FIG. 1, the cam is shown with follower 90 located at approximately the midpoint of a constant radius dwell section 100 which subtends an angle of about 68° about the cam axis. When roller 90 is engaged with the dwell section 100 of cam 92, the upper and lower platens 20 and 22 are located in their mold closed position. Thus, if the cam 92 were to be rotated at a constant angular velocity such that one complete rotation of the cam took 1,080 milliseconds (0.333°/millisecond or 1° every 3 milliseconds), the mold platens would be held in the closed position for 204 milliseconds. The present invention is operable to enable the time during which the mold platens are held in their closed position to be increased (or decreased) without affecting the time duration of any of the other stages of the mold opening and closing cycle. This also gives the ability to vary the speed at which the platens close.

Figure 5:
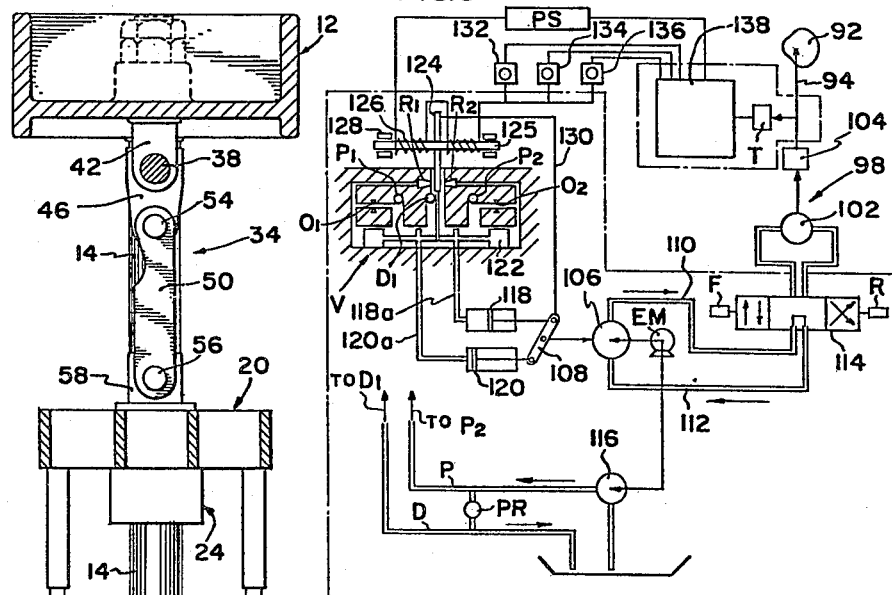
FIG. 5 is a schematic diagram of an exemplary form of control system.

One commercially available exemplary control arrangement which we have discovered can be adapted for enabling the variation of the mold closing and/or dwell time in the system for the mold closed position of platens 20 and 22 is shown in the schematic diagram of FIG. 5.

In the control arrangement shown in FIG. 5, cam shaft 94 is driven by a drive means 98 which includes a rotary hydraulic motor 102 and a gear box 104 whose output is coupled directly to cam shaft 94. The motive power for motor 102 is derived from a hydraulic pump 106 having a swash plate coupled to a swash plate control lever 108 in a manner such that pivotal movement of the control lever 108 adjusts the angle of the swash plate which in turn varies the output of pump 106 to in turn control the speed of motor 102. The output 110 and intake 112 conduits of pump 106 are connected to a three position four-way reversion valve 114 which is normally positioned, as shown, in a neutral position in which the internal connections of the valve directly connect conduit 110 to conduit 112 so that operation of pump 106 simply circulates hydraulical fluid from its output to its intake side. Valve 114 functions, in accordance with the energization of its controlling solenoids F and R to drive motor 102 in a forward direction if solenoid F is energized, to drive motor 102 in a reverse direction if solenoid R is energized, or to bypass fluid from motor 102, as shown in the diagram, if neither solenoid F or R is energized.

Pump 106 is driven at a constant speed by a constant speed electric motor EM which is also coupled to simultaneously drive at a constant speed a second auxiliary pump 116. The function of pump 116 is to supply operating pressure to a pair of reciprocatory hydraulic motors 118, 120 whose piston rods are coupled to swash plate control lever 108 to position the lever.

The pistons of motors 118, 120 are spring biased to the head ends of their respective cylinders and the piston rods are thus positioned in accordance with the magnitude of the pressure supplied to the head end of the respective motors. Regulation of this pressure is accomplished by an electric servo control valve designated generally V. Suitable valves of this type are commercially available as, for example, from J. N. Fauver, Inc. of Madison Heights, Michigan.

To briefly describe the operation of valve V, pressure from pump 116 is supplied via conduit P which is connected into valve D to supply pressure to the interior of the valve via inlets $P_1$, $P_2$. The sump of pump 116 is connected via conduit D to the valve outlet at $D_1$. Positioning of valve spool 122 is controlled by a flapper 124 which is normally maintained in a centered position between a pair of return nozzles $R_1$ and $R_2$ which communicate respectively with the opposite ends of spool 122. In normal or steady state condition, fluid under pressure entering valve V via inlets $P_1$ and $P_2$ flows via restricted orifices $O_1$ and $O_2$ to the respective nozzles $R_1$, $R_2$ and thence to the valve outlet at $D_1$. If flapper 124 is centered between nozzles $R_1$ and $R_2$ the flow from both nozzles is equal and thus the pressure exerted at opposite ends of spool 122 is equal. Under these conditions, the spool is centered and conduits 118a and 120a which respectively connect swash plate positioning motors 118 and 120 to the valve are blocked by the valve spool so that the pistons of the respective motors will be maintained in the positions shown.

If the flapper is moved off center, say slightly to the right as viewed in FIG. 5, it will restrict the flow of fluid from nozzle $R_2$, while at the same time permitting an increased rate of flow from the nozzle $R_1$. This will thus increase the pressure at the right hand end of spool 122, while decreasing the pressure at the left hand end of the spool to thus shift the spool off center. This off center positioning of the spool will, in the case described, permit fluid under pressure from inlet $P_2$ to flow into conduit 118a, while at the same time conduit 120a is uncovered to communicate with valve outlet $D_1$.

Flapper 124 is provided with an armature 125 carrying a coil 126 which can electromagnetically react with permanent magnet pole pieces 128 to shift flapper 124 in accordance with the electric current flow through coils 126. Electromagnetic positioning of flapper 124 is against the action of a biasing spring (not shown) and a mechanical feedback system schematically illustrated at 130 is coupled between swash plate control lever 108 and flapper 124.

When an electric signal in the form of a DC current of constant magnitude is supplied to coils 126, flapper 124 will be shifted from its centered position to induce a shifting of valve spool 122 as described above, which will in turn connect one of the swash plate positioning motors 118 and 120 to the high pressure side of pump 116, while simultaneously connecting the other motor to a low pressure side of pump 116. This will cause swash plate positioning lever 108 to pivot from the position shown. The pivoting movement of the swash plate control lever is mechanically transmitted via feedback system 130 to the flapper in a direction opposing the motion of the flapper induced by the electric signal. Eventually, the mechanical feedback via system 130 wil counterbalance the force supplied to the flapper by the electromagnetically induced signal and flapper will return to its centered position. In this manner, swash plate control lever 108, and thus the output of pump 106, can be regulated in accordance with an electric signal applied to coils 126.

In the embodiment shown in FIG. 5, the control system is arranged to provide three different electric signals to coils 126, to thus establish three different outputs of pump 106, and hence three different rotary speeds of motor 102.

Electric current is supplied to coils 126 from an electric power supply PS via one of three variable potentiometers 132, 134, 136 which are connected to power supply PS via a programmable limit switch system schematically illustrated at 138. The programmable limit switch system 138 may take the form of a commercially available solid state programmable limit switch system manufactured by Rotary Technology, Inc., of Bridgeport, Michigan, and identified by the manufacturer as its Model 5001. This particular system includes a transducer T which is coupled to cam shaft 94 and generates an electric signal representative of the angular position of the shaft to a high degree of precision. The shaft angle signal generated by transducer T actuates limit switches coupled within system 138 to open and close the limit switches at adjustably selected shaft angles. Each of potentiometers 132, 134, 136 is connected to power supply PS through an individual limit switch so that, for example, power supply PS supplies current to coil 126 via potentiometer 132 while shaft 94 is rotating between shaft angles of 0° and 90° and power supply PS is connected to coil 126 via potentiometer 134 over shaft angles between 90° and 235°, etc.

System 138 is analogous to a system in which three mechanically actuated limit switches are opened and closed by cams arranged on shaft 94. As compared to such a mechanically actuated system, the solid state system 138 possesses the advantage of permitting a quick and simple resetting or selection of the shaft angles at which the switches are to be actuated by a simple adjustment of a variable circuit element in the electric circuit of system 138. Potentiometers 132, 134, and 136 likewise permit a quick and simple adjustment of the speed of rotation of motor 102.

The control circuit shown in FIG. 5 is operable to condition motor 102 to drive at any of three selected speeds at selected angular portions of a single revolution of cam shaft 94, one complete revolution of cam shaft 94 representing a complete cycle of movement at platens 20, 22 from their mold open position to their mold closed position and back to the original mold open position. As previously explained, cam 92 includes dwell sections of fixed angular extent which, when engaged by follower 90, hold the platens either in their mold closed or mold opened position. In terms of forming articles by the machine, as a general proposition it is desired to open the mold as quickly as possible and to maintain the mold in its open position a minimum amount of time consistent with the ejection of formed articles and the feeding of a new sheet of material between the opened molded platens. These two phases of the machine cycle are thus timed in accordance with the operating capabilities of the sheet feeding and sheet extracting mechanisms and are substantially independent of the molding material or the type of articles being formed.

However, the time period during which the platens must remain in their mold closed position to form the article can vary considerably depending upon the material and type of article being formed, and the rate of closure of the mold platens, particularly in plug assist operations, likewise must be capable of variation. For example, when forming egg cartons from a foamed material, too rapid a closure of the mold platens will cause the plugs to crack the material, and the foamed material requires a longer mold closed dwell than might be required, for example, for the formation of a styrene cup.

The control system described above provides the capability of selectively varying the cycle time of any selected portion of the cycle without requiring replacement of the cam and in a manner such that varying the time required for one portion of the cycle does not effect the time required to form any other selected portion of the cycle.

In the disclosed embodiment, three alternative speed settings for motor 102 are established by appropriate adjustment of the three potentiometers 132, 134, 136. The three potentiometers are respectively connected into the circuit between power supply PS and coil 126 at selected angular positions of cam shaft 94 by the programmable limit switch system 138.

Referring to FIG. 1, the angular extent of dwell section 100 of cam 92, for purposes of description, will be assumed to be approximately 70°. Diametrically opposite dwell section 100 is a second swell section 100a of constant radius having an angular extent of approximately 90°. When dwell section 100a is engaged with follower roller 90, the mold platens are held in their mold open position. Between the two dwell sections 100 and 100a are two transition sections which correspond to the closing and opening movement of platens 22. Each of these latter sections is of an extent of approximately 100°, measured about the axis of rotation of cam 92.

Figure 6:
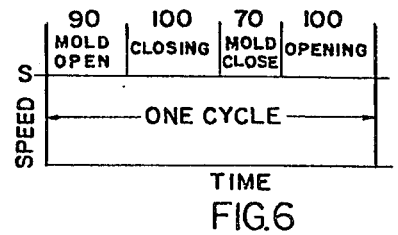
FIGS. 6 and 6a are graphical representations showing the relationship between a normal and extended cycle.
Figure 6A:
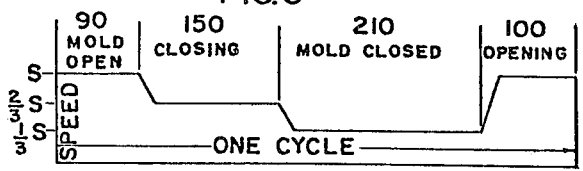

In FIGS. 6 and 6a, two speed versus time charts are presented, both drawn to the same scale. FIG. 6 shows a speed time chart in which cam 92 is driven at a single constant speed throughout one complete revolution, representing one complete cycle of movement of platens 20 and 22. With the angular relationships of the various portions of the cam periphery as described above, during the complete cycle of one 360° rotation of the cam, the mold is open for 90 time units, is moving from the open to the closed position over 100 time units, remain closed for 70 time units and requires 100 time units to move back to its open position to complete the cycle. For a constant speed of rotation of the cam, these proportions would remain the same, regardless of the magnitude of the constant speed S at which the cam was rotated.

FIG. 6a shows a speed versus time chart in which the control circuit of FIG. 5 is set to provide three different constant speeds of rotation of cam 92 at selected points during the cycle. For purposes of simplification, it will be assumed that these three speeds are a speed S of the same magnitude as that of FIG. 6, an intermediate speed of a magnitude of two thirds S and a slow speed of one third S. The speeds are changed at the indicated points during the cycle.

With the cam running at the same speed S as in the chart of FIG. 6 during the mold open portion of the cycle, the mold open portion of the cycle consumes the same number of time units (90) as in the constant speed example of FIG. 6. However, as the cam follower roller 90 moves from the mold closed dwell section 100a of cam 92 onto the variable radius mold closing section, the programmable limit switch system 138 of FIG. 5 actuates to shift the speed of motor 102 from speed S to the intermediate speed two thirds S. This speed change is not instantaneous but requires some time, hence the sloped portion of the curve of FIG. 6a. Neglecting the effect of this speed transition, the slower speed of rotation of the cam while it is driving the platens toward their closed position requires a greater period of time to close the platens, thus in the curve of FIG. 6, 150 time units are required to close the platen as compared to 100 time units in the constant speed example.

As the cam follower moves from the transition section onto dwell section 100, the system 138 is programmed to again shift the speed of motor 102 to a speed of one third S.

Because the speed of rotation of the cam in the curve of FIG. 6a is now only one third of the speed at which it transited this section of its movement in the curve of FIG. 6, three times as much time is now required for the dwell section 100 of the cam to rotate past the cam follower, and hence the mold remains in its closed position for 210 time units. When the dwell section 100 has been rotated past the follower, the programmable limit switch system shifts the speed of motor 102 back to the original speed S.

The setting of system 138 to accomplish the above speed shifts is believed to be apparent from the previous description, however, it will be briefly reviewed. As previously stated, the transducer T generates a signal which provides a precise indication of the shaft angle of cam shaft 94. Each of the limit switches within the system is provided with two setting adjustments which can be readily set, as by a screwdriver type adjustment, so that the switch contacts can be set to close at a specific shaft angle and to open at another selected specific shaft angle. The circuitry is so adjusted that only one of the three potentiometers 132, 134 and 136 will be connected via a limit switch to the power supply at any given time. Thus, speed shifting is quickly and simply adjusted as required, the limit switches of system 138 being set to establish the various shaft angles at which shifting is to occur. The magnitude of the speed is determined simply by adjusting potentiometers 132, 134 and 136 as desired. While an arrangement establishing three different speeds has been disclosed, it is believed apparent that any number of speed settings could be achieved simply by increasing the number of programmable limit switches and potentiometers.

As stated above, the particular circuit disclosed does not provide an instantaneous speed change from one speed to another, and this fact must be taken into account in choosing the shaft angles at which a speed change is to be initiated. However, it is believed apparent that the system disclosed provides an extremely flexible and convenient method for varying the time duration of any selected portion of a cycle independently of all other portions of the cycle, thus conditioning the machine for operation in forming a wide variety of products from a wide variety of materials.

In a second embodiment of the machine, which is disclosed in FIGS. 7 and 8, the molds M1 and M2 are operated separately by separate cams, since it is desired that the upper mold M1 reaches a closed position prior to the time that the lower mold M2 does. For purposes of convenience, it may be assumed that the parts for moving the upper mold M1 are the same as previously disclosed with the exception that the shaft 40 now operates only the lower mold M2 and a second rock shaft 40' operates upper mold M1. The same numbers with a prime designation have been utilized to designate the separate drive for upper mold platen 20 and the numbers for parts which are common to both embodiments remain the same.

The cam 92' which operates mold M1 can be mounted on the same shaft 94 as the cam 92, and is employed to drive the separate rock shaft 40' to which the link member 76 is now fixed. Thus, in this embodiment of the invention, there is similarily a cam follower 90' gravitationally biased against the periphery of cam 92' at all times. Follower 90' is rotatably carried on pin 84' which is carried by a support link 86' whose opposite end is pivotally supported on the machine base as at 88'. The drive link 82' is pivotally carried by pin 84' and connects with shaft 40' via shaft 80' and link 78', in the same manner.

The shaft 40' which may be considered to be axially in alignment with the shaft 40, and located in any convenient position, such as slightly to the right of link 76, is now connected to the upper mold rock shaft 38 by the links 76, 68 and 74. Typically, the cam 92' will operate molds M1 and M2 in the manner disclosed in FIG. 8. As FIG. 8 indicates, the mold M1 reaches the mold closed position somewhat in advance of mold M2.

Various speed time relationships are possible with both embodiments of the invention, and what has been said previously with respect to the first embodiment applies also to the second embodiment. Potentiometers 132, 134, and 136 permit the quick and simple adjustment of the speeds of rotation of motor 102 in both instances.

The disclosed embodiments are representative of presently preferred forms of the invention, but are intended to be illustrative rather than definitive thereof. The invention is defined in the claims.

We claim:

1. In a thermoforming machine having a frame; a pair of mold carrying platens mounted on said frame for movement toward and away from each other between a mold open and a mold closed position, and motor driven means including cam and cam follower means operable when driven to cyclically drive said platens between said mold open and mold closed position, the improvement wherein said motor driven cam and cam follower means comprises a cam for each platen mounted on said frame for rotation about an axis, each cam having a dwell portion of given angular extent lying at a constant radius from the axis about which it rotates, said follower means including a cam follower for each platen engaged with each cam and operable to maintain the mold platen it drives in mold closed position when the cam follower is engaged with the dwell portion of its cam, variable speed motor means for driving said cams in rotation, and control means for selectively controlling the speed of said motor means during that portion of the rotary cycle of said cams when said cam followers are engaged with said dwell portions to thereby adjustably vary the times during which said mold platens are held in said mold closed position.

2. The machine defined in claim 1 wherein the mold carrying platens carry a female mold having mold cavity configurations and a male mold having plug assist configurations; and the female mold carrying platen reaches closed position slightly before the male mold carrying platen.

3. In a thermoforming machine having a frame, a pair of mold carrying platens mounted on said frame for movement toward and away from each other between a mold open and a mold closed position, and variable speed drive means for driving each of said platens in intermittent motion through a cycle wherein each of said platens are shifted from said mold open position to said mold closed position and subsequently returned to said mold open position; the improvement comprising control means operable for varying the speed of drive of said drive means driving each platen during said cycle to cause said drive means to drive each platen at different speeds during different portions of the same cycle.

4. The machine defined in claim 3 in which said control means is operable to select a slower speed setting for a stage of each platen which includes the mold closed stage of each platen than for the remaining portions of the cycle.

5. In a thermoforming machine having a frame, a pair of mold carrying platens mounted on said frame for movement toward and away from each other between a mold open and a mold closed position, and a motor operable when driven to cyclically drive said platens between said mold open and mold closed position, the improvement wherein drive elements driven by said motor are connected with each of said platens and are operable to maintain each of said mold platens in mold closed position during a dwell period, and control means is provided for varying the speed of said motor during a portion of the cycle of said drive elements for each platen which includes the time when each platen is in mold closed position.

6. A method of operating a thermoforming machine having a pair of mold carrying platens mounted on a frame for movement toward and away from each other between a mold open and a mold closed position, a motor operable when driven to cyclically drive said platens between said mold open and mold closed position, and drive elements driven by said motor connected with each of said platens and operable to maintain each of said mold platens in mold closed position during a dwell period, comprising varying the speed of drive of said motor during a portion of the cycle of said drive elements for each platen which includes the time when each platen is in mold closed position.

7. In a differential pressure thermoforming machine having a frame, a pair of mold carrying platens mounted on said frame for relative movement in which at least one moves between a mold open and a mold closed position; mating molds carried by said platens; and motor driven means including cam mechanism and cam follower means connected to and operable when driven to cyclically drive at least one of said platens between said mold open and mold closed position; the improvement wherein said motor driven cam mechanism and cam follower means comprises at least one cam mounted on said frame for rotation about a first axis and having a dwell portion of given angular extent lying at a constant radius from said axis, said follower means including a cam follower engaged with said cam and operable to drive said platen through a cycle from mold open to mold closed position and back to said mold open position in which it maintains at least one of said mold platens in said mold closed position when said cam follower is engaged with said dwell portion of said cam, and a motor assembly having control means for driving said cam continuously in rotation about said axis, and adapted for driving it at a different constant speed than it drives the cam in another portion of said cycle, during at least some of that portion of the rotary cycle of said cam when said cam follower is engaged with said dwell portion.

8. The invention defined in claim 7 wherein said control means comprises speed setting means operable in a first position to drive said motor assembly at a first constant speed and operable in a second position to drive said motor assembly at a second constant speed, and actuating means operable to shift said speed setting means between said first and said second positions at selected rotative positions of said cam.

9. The invention defined in claim 8 wherein said cam is formed with a constant radius dwell section of fixed angular extent about the axis of rotation of said cam, said follower means when engaged with said dwell section being operable to hold said molds in said mold closed position, said control means being operable to selectively adjust the time interval during which said molds remain in said closed position by establishing a selected speed of rotation of said cam over all or a selected portion of the rotary movement of said cam wherein said follower means is engaged with said dwell section.

10. The invention defined in claim 8 wherein said cam is formed with a closure section of fixed angular extent about the axis of rotation of said cam, said follower means when traversing said closure section being operable to move said molds relatively from said mold open to said mold closed position, said control means being operable to selectively adjust the rate of closure by establishing a selected speed of rotation of said cam over all or a selected portion of the rotary movement of said cam wherein said follower means is traversing said closure section.

11. In a thermoforming machine having a frame, a mold and platen assembly mounted on said frame and including a pair of mating molds mounted for relative movement between a mold open and a mold closed position, and a continuously driven motor operable when driven to cyclically drive said assembly and to effect the mold open and mold closed positions, the improvement wherein drive elements driven by said motor in continuously consecutive cycles are connected with said assembly and operable to drive said assembly through consecutive cycles effecting said relative movement and in which said molds are maintained in said mold closed position during a dwell period, and control means is provided for varying the speed of revolution of said motor during selected portions of the same cycle of the assembly to drive the motor at a different speed during a portion of each cycle which includes at least part of the dwell period.

12. The invention defined in claim 11 in which the control means is programmed to drive said motor at a maximum speed of revolution during the period the molds are in mold open position and are relatively moving from mold closed to mold open position, a lesser speed of revolution when the molds are relatively moving from mold open position to mold closed position, and a still lesser speed of revolution when the molds are in mold closed position.

13. The invention defined in claim 11 in which the control means is programmed to drive said motor at one speed of revolution during the time when the molds are in mold closed position and another speed of revolution when the molds are in mold open position.

14. The invention defined in claim 11 in which the motor comprises a rotary hydraulic motor driven by a hydraulic system including a pump, and the control means is operable to vary the output of the pump during selected portions of the same cycle.

15. The invention defined in claim 14 in which the output of said pump is controlled by an electrical signal, and the control means includes a shaft angle sensing device.

16. The invention defined in claim 7 in which the control means is programmed to drive said motor at one speed of revolution during the time when the molds are in mold closed position and another speed of revolution when the molds are moving relatively from mold closed to mold open position.

17. A thermoforming machine having a frame; a mold and platen assembly mounted on said frame and including a pair of mating molds, at least one being mounted for movement between a mold open and a mold closed position; a drive motor; driving elements, driven by said motor, connected with said one mold, said motor being operable when driven to cyclically drive said one mold relatively between mold open and mold closed position, and operable to maintain said one mold in said mold closed position during a dwell period, and control means for varying the speed of revolution of said motor during each cycle of said drive elements and driving said one mold at predetermined different speeds during each cycle from mold open to mold closed position and back.

18. The invention defined in claim 17 in which the control means is programmed to drive said motor at a maximum speed of revolution during the period the molds are in mold open position and said one mold is relatively moving from mold closed to mold open position, a lesser speed of revolution when said one mold is relatively moving from mold open position to mold closed position, and a still lesser speed of revolution when the molds are in mold closed position.

19. The invention defined in claim 17 in which the control means is programmed to drive said motor at one speed of revolution during the time when the molds are in mold closed position and another speed of revolution when the molds are in mold open position.

20. The invention defined in claim 17 in which the motor comprises a rotary hydraulic motor driven by a hydraulic system including a pump, and the control means is operable to vary the output of the pump during selected portions of the same cycle.

21. The invention defined in claim 20 in which the output of said pump is controlled by an electrical signal, and the control means includes a shaft angle sensing device.

22. A thermoforming machine having a frame, a mold and platen assembly mounted on said frame and including a pair of mating molds mounted for relative movement between a mold open and a mold closed position; a continuously driven, rotary hydraulic motor, operable when driven to drive said assembly to effect the mold open and mold closed positions; drive elements, driven by said motor, connected with said assembly and operable to drive said assembly through consecutive cycles effecting said relative movement and in which said molds are maintained in said mold closed position during a dwell period; a hydraulic system including a pump connected with the motor; and control means operable to vary the output of the pump during selected portions of the same cycle of the assembly to drive the motor at a different speed during a portion of each cycle of the assembly which includes a portion of the dwell period.

23. The invention as defined in claim 22 wherein said drive elements comprise at least one cam driven in rotation and follower means engaged between said cam and said assembly for moving said assembly in response to rotation of said cam, one revolution of said cam corresponding to one cycle of said assembly, and said control means includes means for establishing a selected constant speed of rotation of said cam over a selected angular portion of one revolution of said cam and for driving the assembly at independently selected different speeds during independently selected different portions of one revolution of said cam.

24. The invention defined in claim 23 wherein said control means comprises speed setting means operable in a first position to operate said pump to drive said motor at a first constant speed and operable in a second position to operate said pump to drive said motor at a second constant speed, and actuating means operable to shift said speed setting means between said first and said second positions at selected rotative positions of said cam.

25. The invention defined in claim 23 wherein said second speed is slower than said first speed, and said actuating means maintains said speed setting means in said second position throughout a selected range of rotative positions of said cam during which said dwell portion is engaged with said cam follower.

26. The invention defined in claim 25 wherein said speed setting means permits adjustably selecting the angular positions of said cam at which said actuating means is operable to shift said speed setting means between said first and said second positions.

27. The invention defined in claim 22 in which the control means is programmed to drive said motor at a maximum speed of revolution during the period the molds are in mold open position and are relatively moving from mold closed to mold open position, a lesser speed of revolution when the molds are relatively moving from mold open position to mold closed position, and a still lesser speed of revolution when the molds are in mold closed position.

28. The invention defined in claim 22 in which the output of said pump is controlled by an electrical signal, and the control means includes a motor driven shaft and shaft angle sensing device.

29. In a thermoforming machine having a frame, a mold and platen assembly mounted on said frame and including a pair of mating molds mounted for relative movement between a mold open and a mold closed position; a continuously driven, rotary motor, operable when driven to drive said assembly to effect the mold open and mold closed positions; drive elements driven by said motor, connected with said assembly and operable to drive said assembly through consecutive cycles effecting said relative movement and in which said molds are maintained in said mold closed position during a dwell period; the improvement wherein a variable input energy transmission system is provided to drive said motor at at least two different constant speeds; and control means, comprising speed setting means operable in a first position to vary the energy input from said energy transmission system to said motor to drive it at a first constant speed and operable in a second position to vary the energy input from said energy transmission system to said motor to drive it at a second constant speed, is provided to drive said motor at at least each of said two speeds during each said cycle and at one of such constant speeds during a portion of each cycle of the assembly which includes a portion of the dwell period.

30. The invention defined in claim 2 wherein said motor is a hydraulic motor and a hydraulic system including a pump drivingly connected with the motor.

* * * * *